J. FLEMING.
Hydrant.
No. 167,656. Patented Sept. 14, 1875.
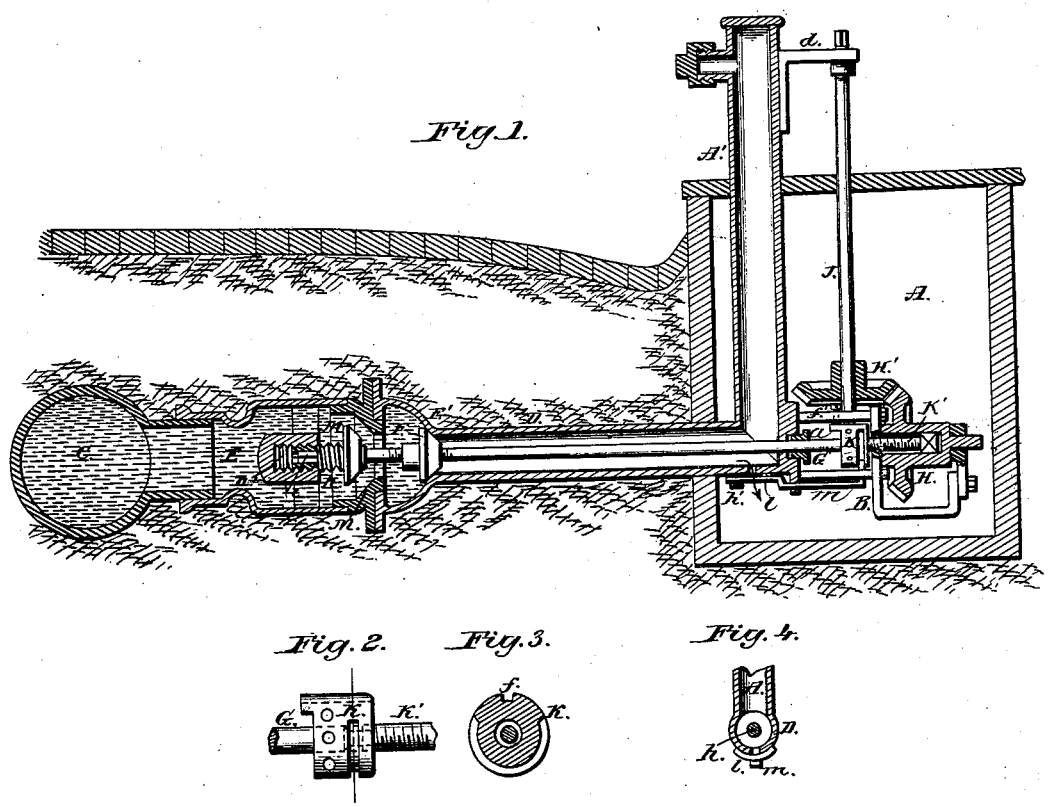

UNITED STATES PATENT OFFICE.

JAMES FLEMING, OF CHICAGO, ILLINOIS.

IMPROVEMENT IN HYDRANTS.

Specification forming part of Letters Patent No. 167,656, dated September 14, 1875; application filed June 4, 1875.

*To all whom it may concern:*

Be it known that I, JAMES FLEMING, of Chicago, in the county of Cook and State of Illinois, have invented new and useful Improvements in Hydrants; and I do hereby declare the following to be a full, clear, and exact description thereof, which will enable others skilled in the art to which it appertains to make and use the same, reference being had to the accompanying drawing, forming part of this specification, in which—

Figure 1 is a vertical longitudinal central section of a hydrant, embodying my said invention. Fig. 2 is a side elevation of the collar employed in operating the valves. Fig. 3 is a cross-section of the same; and Fig. 4 is a cross-section of the pipe leading from the stem to the water-main, showing the opening through which the water escapes when the cut-off valve is closed.

Similar letters of reference indicate like parts in the several figures of the drawing.

My invention relates more especially to that class of hydrants known in the art as fire-plugs; but may be used in other classes of hydrants now in common use, and its object is to prevent them from freezing.

To that end it consists in the several combinations of parts, whereby the cut-off valves are located at a point between the curbing of basin around the stem and the water-main underneath the street below the freezing-point, as will be more fully understood by the following description and claims.

In the drawings, A represents the basin, and A' the stem or discharge-pipe of the fire-plug, both of which are made in any of the known forms. B is a metal frame-work, which is permanently secured to the lower end of the stem within the basin. C is the water-main, which is located below the surface of the street in the usual manner. D is the leader-pipe, which is attached to the lower end of the stem in any suitable manner, and communicates with the water-main through coupling E. F is the cut-off valve, which is seated at F' within the end of pipe D adjacent to the coupling. G is the shaft for operating the valves. This shaft passes centrally through pipe D, and is journaled at its outer end in a suitable stuffing-box, *a*, secured to the end of the pipe through which it passes, and is so arranged as to admit of a free longitudinal movement. The inner end of this shaft passes centrally through valve F, and is screw-threaded, by which means it is connected thereto. H is a bevel-gear wheel, which is journaled to frame B, and so arranged as to admit of a free and easy rotary movement. This gear engages a corresponding gear-wheel, H', on a vertical crank-shaft, J, journaled at its lower end to frame B, and at its upper end to a bracket, *d*, permanently attached to the upper end of stem A'. Permanently secured on the outer end of shaft G is a collar, K, swiveled, or otherwise so connected, to the end of a screw-threaded bolt, K', as to allow the bolt to revolve independent of the shaft. This bolt passes through a screw-nut fixed to one of the members of frame B into a suitable cavity formed centrally in the shaft of wheel H, as shown in Fig. 1, and is so arranged as to revolve with the shaft, by which means a longitudinal movement is imparted to shaft G by the rotation of wheel H. The upper surface of collar K is provided with a longitudinal groove, *f*, adapted to loosely receive the lower end of a set-screw, *f'*, passing through one of the members of the frame, by which shaft G is prevented from revolving with screw K'. The lower surface of pipe D is provided with and escape-opening, *h*, shown in Figs. 1 and 4. L is an escape-valve, which is secured to a movable bracket, *m*, affixed to frame B and connected with collar K. The arrangement of this bracket and valve is such that when shaft G is moved in the direction of its length by the rotation of the crank-shaft, so as to force the cut-off valve F off its seat to admit the water from the main pipe into pipe D, valve L is moved immediately under opening *h*, closing the same, preventing any leakage of water; but when shaft G is moved in the opposite direction, so as to reseat the cut-off valve, the escape-valve is moved from its seat, allowing the water in pipe D and stem A' to escape through opening *h* into the basin, from which it escapes into the sewer in the usual manner.

It is sometimes found necessary to remove the leader and stem from its place to repair the cut-off valve, or some of the parts employed in operating the same, in which case it is necessary to prevent the escape of water from the main pipe C. To accomplish this I connect the leader to the coupling in such a manner as to admit of being readily detached, and provide the coupling with a main valve, M. This valve is seated in the end of the coupling adjacent to the inner end of the leader, as shown at M', and is provided with a stem, n, extending toward the main pipe C. This stem is screw-threaded externally, and adapted to fit a corresponding screw-nut, n', centrally secured within the coupling. The inner end of shaft G is made square, and adapted to pass loosely into a corresponding mortise, i, formed through the center of valve M into its stem n, as shown in Fig. 1. The arrangement of these parts is such that, by removing set-screw f' from groove f in collar K, a rotary motion may be imparted to shaft G, which is communicated to the main valve M, causing its stem to turn in the nut moving the valve to its seat, thus preventing any escape of water from the coupling, when pipe D may be removed.

It is readily seen that with this arrangement of valves, and means employed to operate them, the cut-off valve may be located at any desired point between the curbing of the basin and the water-main, consequently are rendered perfectly secure from the frost, which is not the case with that class of hydrants now in use.

Having thus described my invention, I claim—

1. In combination with valve F and seat F', located at the inner end of pipe D adjacent to the street-main, the shaft G and screw-bolt K', the latter swiveled to the shaft, whereby a longitudinal movement is imparted to said shaft for opening and closing the valve by the rotation of the bolt, as specified.

2. In combination with coupling E, having the valve-seat M', the shaft G and main valve M, the latter located between valve F and the street-main, as and for the purpose specified.

3. In combination with screw-bolt K' and mechanism to rotate the same, the collar K attached to shaft G, and swiveled to the bolt, whereby a longitudinal movement is imparted to the shaft by the rotation of the bolt for opening and closing the cut-off valve, and to admit of a rotary movement of the shaft independent of the bolt for opening and closing the main valve, as specified.

4. In combination with shaft G and collar K, the escape-valve L, arranged to open and close the escape-opening h by a longitudinal movement of the shaft, as specified.

JAMES FLEMING.

Witnesses:
  J. T. WHIPPLE,
  W. H. BURK.